(12) United States Patent
Shemet et al.

(10) Patent No.: US 11,356,605 B1
(45) Date of Patent: Jun. 7, 2022

(54) DUAL-STREAM VIDEO MANAGEMENT

(71) Applicant: Samsara Inc., San Francisco, CA (US)

(72) Inventors: Sabrina Shemet, Felton, CA (US);
Matthew Basham, Oakland, CA (US);
John Charles Bicket, Burlingame, CA (US); Mathew Chasan Calmer, Sacramento, CA (US); Justin Delegard, West Chester, OH (US); Derrek Harrison, San Francisco, CA (US);
David Liang, San Francisco, CA (US);
Ava O'Neill, San Francisco, CA (US);
Cassandra Lee Rommel, Chicago, IL (US); Meelap Shah, Portland, OR (US); Casey Takahashi, San Francisco, CA (US); Ingo Wiegand, San Francisco, CA (US)

(73) Assignee: SAMSARA INC., San Francisco, CA (US)

( * ) Notice: Subject to any disclaimer, the term of this patent is extended or adjusted under 35 U.S.C. 154(b) by 0 days.

(21) Appl. No.: 17/365,300

(22) Filed: Jul. 1, 2021

Related U.S. Application Data

(60) Provisional application No. 63/186,631, filed on May 10, 2021.

(51) Int. Cl.
| | |
|---|---|
| *H04N 5/232* | (2006.01) |
| *H04N 5/268* | (2006.01) |
| *H04N 5/247* | (2006.01) |
| *G06F 16/71* | (2019.01) |
| *B60R 11/04* | (2006.01) |
| *G06F 16/783* | (2019.01) |
| *B60R 11/00* | (2006.01) |

(52) U.S. Cl.
CPC ......... *H04N 5/23232* (2013.01); *B60R 11/04* (2013.01); *G06F 16/71* (2019.01); *G06F 16/786* (2019.01); *H04N 5/247* (2013.01); *H04N 5/268* (2013.01); *B60R 2011/0003* (2013.01)

(58) Field of Classification Search
CPC .... H04N 5/23232; H04N 5/247; H04N 5/268; G06F 16/71; G06F 16/786; B60R 11/04; B60R 2011/0003
See application file for complete search history.

(56) References Cited

U.S. PATENT DOCUMENTS

| | | |
|---|---|---|
| 5,917,433 A | 6/1999 | Keillor et al. |
| 6,452,487 B1 | 9/2002 | Krupinski |
| 6,732,111 B2 * | 5/2004 | Brodersen ............. G06F 16/178 |
| 8,633,672 B2 | 1/2014 | Jung et al. |

(Continued)

*Primary Examiner* — Joseph Suh
(74) *Attorney, Agent, or Firm* — Knobbe, Martens, Olson & Bear LLP

(57) ABSTRACT

An Internet of Things (IoT) or vehicle dash cam may store both a high-resolution and low-resolution video stream on a device. The video streams are selectively accessible by remote devices. Because of the relatively smaller storage requirements of low-resolution video files, retaining of additional video data on the vehicle device (beyond what would be possible with only high-resolution video) is possible. The user may be provided an option to adjust the amount of low-resolution and high-resolution video to store on the device. A combined media file may be generated by a device to include time-synced high-resolution video, low-resolution video, and/or metadata for a particular time period.

18 Claims, 8 Drawing Sheets

(56) References Cited

U.S. PATENT DOCUMENTS

| | | | |
|---|---|---|---|
| 8,719,864 B2* | 5/2014 | Young | H04N 21/482 725/40 |
| 9,024,744 B2 | 5/2015 | Klose et al. | |
| 9,445,270 B1 | 9/2016 | Bicket et al. | |
| 9,477,639 B2 | 10/2016 | Fischer et al. | |
| 10,033,706 B2 | 7/2018 | Bicket et al. | |
| 10,085,149 B2 | 9/2018 | Bicket et al. | |
| 10,102,495 B1 | 10/2018 | Zhang et al. | |
| 10,173,486 B1 | 1/2019 | Lee et al. | |
| 10,173,544 B2 | 1/2019 | Hendrix et al. | |
| 10,196,071 B1 | 2/2019 | Rowson et al. | |
| 10,206,107 B2 | 2/2019 | Bicket et al. | |
| 10,390,227 B2 | 8/2019 | Bicket et al. | |
| 10,579,123 B2 | 3/2020 | Tuan et al. | |
| 10,609,114 B1 | 3/2020 | Bicket et al. | |
| 10,623,899 B2 | 4/2020 | Watkins et al. | |
| 10,827,324 B1 | 11/2020 | Hajimiri et al. | |
| 10,843,659 B1 | 11/2020 | Innocenzi et al. | |
| 11,046,205 B1 | 6/2021 | Govan et al. | |
| 11,122,488 B1 | 9/2021 | Lloyd et al. | |
| 11,126,910 B1 | 9/2021 | Akhtar et al. | |
| 11,128,130 B2 | 9/2021 | Jain et al. | |
| 11,131,986 B1 | 9/2021 | Gal et al. | |
| 11,132,853 B1 | 9/2021 | Akhtar et al. | |
| 11,137,744 B1 | 10/2021 | Heddleston et al. | |
| 11,158,177 B1 | 10/2021 | ElHattab et al. | |
| 11,184,422 B1 | 11/2021 | Bicket et al. | |
| 11,188,046 B1 | 11/2021 | ElHattab et al. | |
| 11,190,373 B1 | 11/2021 | Stevenson et al. | |
| 2002/0061758 A1 | 5/2002 | Zarlengo et al. | |
| 2002/0198976 A1* | 12/2002 | Davenport | H04L 29/06 709/223 |
| 2005/0286774 A1 | 12/2005 | Porikli | |
| 2006/0167591 A1 | 7/2006 | McNally | |
| 2008/0307454 A1* | 12/2008 | Ahanger | G06Q 30/02 725/36 |
| 2008/0319602 A1 | 12/2008 | McClellan et al. | |
| 2009/0240427 A1 | 9/2009 | Siereveld et al. | |
| 2010/0049639 A1 | 2/2010 | Ferro et al. | |
| 2011/0276265 A1 | 11/2011 | Husain | |
| 2012/0201277 A1 | 8/2012 | Tanner et al. | |
| 2012/0235625 A1 | 9/2012 | Takehara | |
| 2012/0303397 A1 | 11/2012 | Prosser | |
| 2013/0162421 A1 | 6/2013 | Inaguma et al. | |
| 2013/0244210 A1 | 9/2013 | Nath et al. | |
| 2013/0279871 A1* | 10/2013 | Chang | H04N 21/2665 386/223 |
| 2014/0012492 A1 | 1/2014 | Bowers et al. | |
| 2014/0095061 A1 | 4/2014 | Hyde | |
| 2014/0098060 A1 | 4/2014 | McQuade et al. | |
| 2014/0195106 A1 | 7/2014 | McQuade et al. | |
| 2014/0278108 A1 | 9/2014 | Kerrigan et al. | |
| 2014/0354227 A1 | 12/2014 | Tyagi et al. | |
| 2014/0354228 A1 | 12/2014 | Williams et al. | |
| 2015/0044641 A1 | 2/2015 | Chauncey et al. | |
| 2015/0074091 A1 | 3/2015 | Walkin et al. | |
| 2015/0226563 A1 | 8/2015 | Cox et al. | |
| 2015/0283912 A1 | 10/2015 | Shimizu et al. | |
| 2016/0275376 A1 | 9/2016 | Kant | |
| 2016/0288744 A1 | 10/2016 | Rutherford et al. | |
| 2016/0343091 A1 | 11/2016 | Han et al. | |
| 2016/0375780 A1 | 12/2016 | Penilla et al. | |
| 2017/0039784 A1 | 2/2017 | Gelbart et al. | |
| 2017/0102463 A1 | 4/2017 | Hwang | |
| 2017/0140603 A1 | 5/2017 | Ricci | |
| 2017/0263049 A1 | 9/2017 | MacDonald et al. | |
| 2017/0286838 A1 | 10/2017 | Cipriani et al. | |
| 2017/0291611 A1 | 10/2017 | Innes et al. | |
| 2017/0332199 A1 | 11/2017 | Elliott et al. | |
| 2017/0345283 A1 | 11/2017 | Kwon et al. | |
| 2017/0366935 A1 | 12/2017 | Ahmadzadeh et al. | |
| 2018/0001771 A1 | 1/2018 | Park et al. | |
| 2018/0012196 A1 | 1/2018 | Ricci et al. | |
| 2018/0025636 A1 | 1/2018 | Boykin et al. | |
| 2018/0063576 A1 | 3/2018 | Tillman et al. | |
| 2018/0093672 A1 | 4/2018 | Terwilliger et al. | |
| 2018/0262724 A1 | 9/2018 | Ross | |
| 2018/0297210 A1* | 10/2018 | Peterson | H04N 19/184 |
| 2019/0003848 A1 | 1/2019 | Hoten et al. | |
| 2019/0118655 A1 | 4/2019 | Grimes et al. | |
| 2019/0174158 A1 | 6/2019 | Herrick et al. | |
| 2019/0244301 A1 | 8/2019 | Seth et al. | |
| 2019/0244483 A1* | 8/2019 | Collins | A63F 13/352 |
| 2019/0286948 A1 | 9/2019 | Sathyanarayana et al. | |
| 2019/0318419 A1 | 10/2019 | VanderZanden | |
| 2019/0327590 A1 | 10/2019 | Kubo et al. | |
| 2019/0327613 A1 | 10/2019 | Bicket et al. | |
| 2020/0053297 A1* | 2/2020 | Tokizaki | G01J 5/0846 |
| 2020/0074397 A1 | 3/2020 | Burda et al. | |
| 2020/0139847 A1 | 5/2020 | Baumer et al. | |
| 2020/0150739 A1 | 5/2020 | Tuan et al. | |
| 2020/0162489 A1 | 5/2020 | Bar-Nahum et al. | |
| 2020/0342230 A1 | 10/2020 | Tsai et al. | |
| 2020/0342235 A1 | 10/2020 | Tsai et al. | |
| 2020/0342274 A1 | 10/2020 | ElHattab et al. | |
| 2020/0342506 A1 | 10/2020 | Levy et al. | |
| 2020/0342611 A1 | 10/2020 | ElHattab et al. | |
| 2020/0344301 A1 | 10/2020 | ElHattab et al. | |
| 2020/0371773 A1 | 11/2020 | Kato et al. | |
| 2020/0389387 A1* | 12/2020 | Magzimof | H04L 45/16 |
| 2020/0389415 A1 | 12/2020 | Zhao et al. | |
| 2021/0006950 A1 | 1/2021 | Hajimiri et al. | |
| 2021/0120306 A1* | 4/2021 | Kunkel | H04N 21/4728 |
| 2021/0166785 A1* | 6/2021 | Yip | G06F 3/0454 |
| 2021/0303194 A1* | 9/2021 | Matsui | G06N 3/04 |
| 2021/0304355 A1* | 9/2021 | Delattre | A63F 13/52 |

* cited by examiner

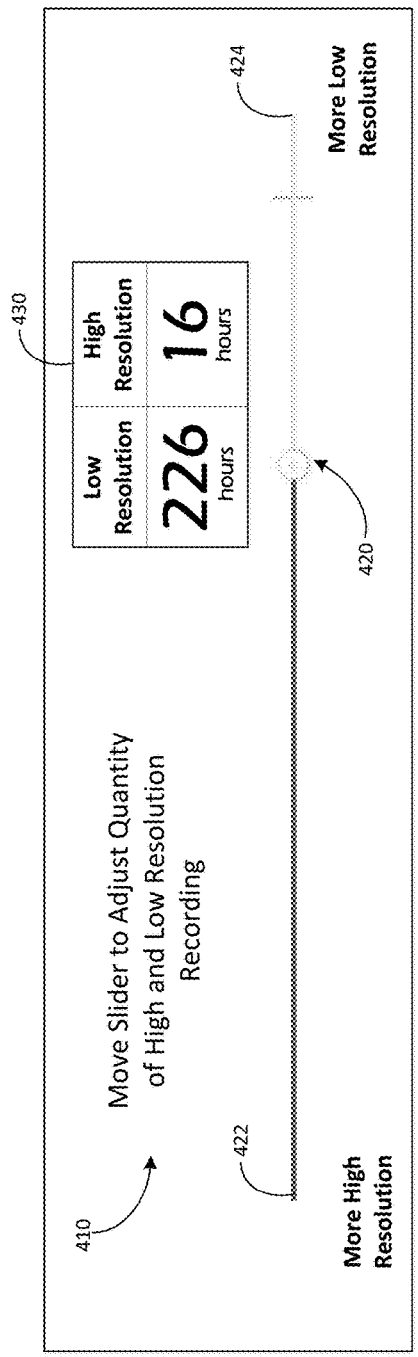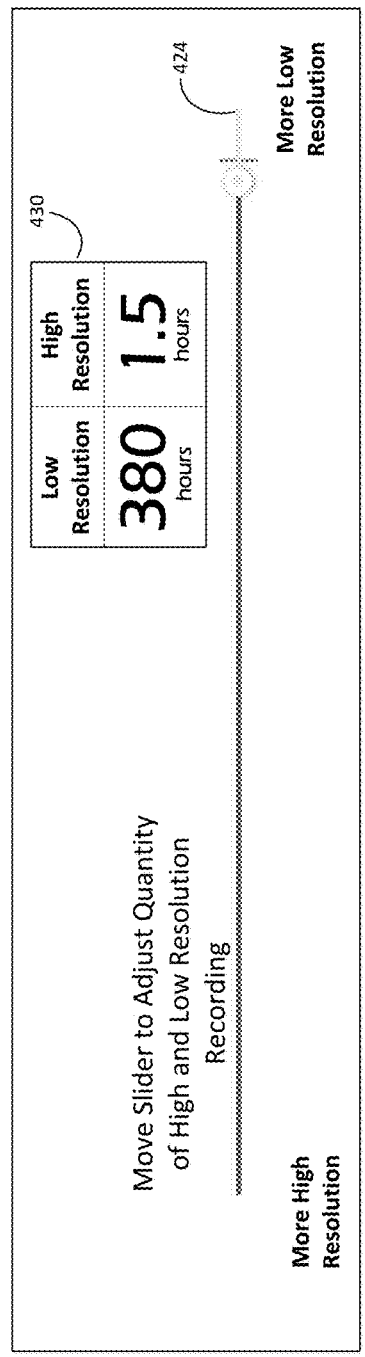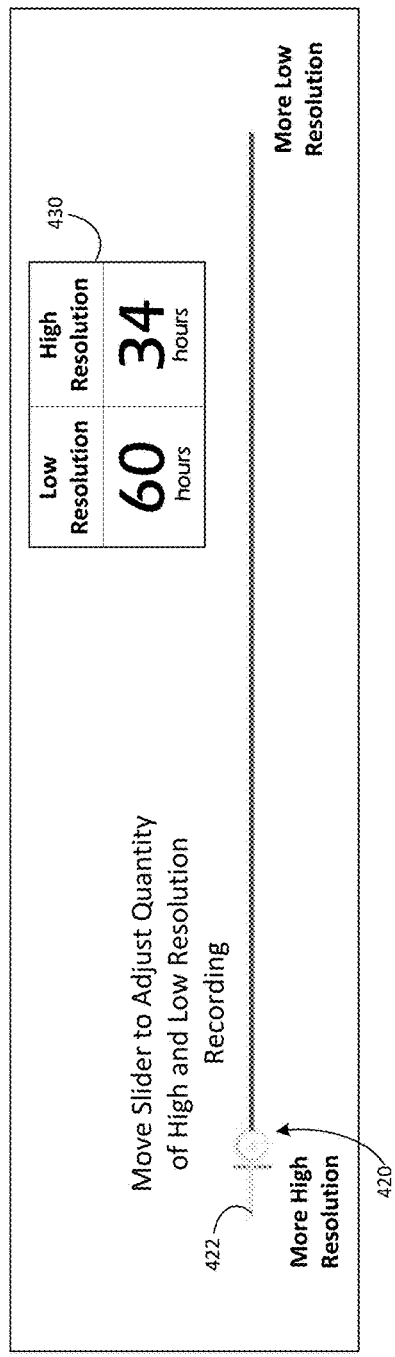

DUAL-STREAM VIDEO MANAGEMENT

FIELD

Embodiments of the present disclosure relate to devices, systems, and methods that manage multiple streams of video data, such as at an Internet of Things (IoT) device or a dash cam in a vehicle.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Processing sensor data from a vehicle that is usable to detect, in real-time, events that are indicative of a crash or increased risk of a crash, requires significant data storage and processing power. Additionally, storage on a small device, such as a dash cam or an IoT device, may be very limited in view of the limited space for a storage medium within the device. Thus, particularly for sensor data such as video data, the amount of data storable on the device may be unduly limited. For example, a safety officer reviewing video data associated with a particular vehicle may find that the amount of video data accessible for review (e.g., the last few hours of video data) is unsatisfactory.

SUMMARY

The systems, methods, and devices described herein each have several aspects, no single one of which is solely responsible for its desirable attributes. Without limiting the scope of this disclosure, several non-limiting features will now be described briefly.

As described in further detail herein, both a high-resolution video stream and low-resolution video stream may be stored on a vehicle device and be selectively accessible by remote devices. Because of the relatively smaller size of the low-resolution video files, retaining of additional video data on the vehicle device is made possible. As discussed below, the user may be provided an option to adjust the amount of low-resolution and high-resolution video to store on the vehicle device. In some embodiments, a combined media file may be generated by a vehicle device to include time-synced high-resolution video, low-resolution video, and/or metadata for a particular time period. For example, the vehicle device may generate a combined media file associated with a safety event that includes, for a particular time period (e.g., 30 seconds) surrounding the safety event, high-resolution video, low-resolution video, audio (e.g., recorded by a microphone in the vehicle device), and metadata such as accelerometer data. This combined media file may be transmitted automatically to a requested device (e.g., to cloud storage accessible by the requested device) upon triggering of the safety event and/or may be transmitted in response to a request for video data (e.g., by a safety officer). The vehicle device may be configured to modify existing combined media files, such as by accessing a combined media file for a particular time period, removing all data except the low-resolution video, and re-storing the combined media file. For example, when video storage space on a vehicle device is low, the device may be configured to strip high-resolution video and metadata from the oldest video data stored on the device.

Further, as described herein, according to various embodiments systems and or devices may be configured and/or designed to generate graphical user interface data useable for rendering the various interactive graphical user interfaces described. The graphical user interface data may be used by various devices, systems, and/or software programs (for example, a browser program), to render the interactive graphical user interfaces. The interactive graphical user interfaces may be displayed on, for example, electronic displays (including, for example, touch-enabled displays).

Additionally, the present disclosure describes various embodiments of interactive and dynamic graphical user interfaces that are the result of significant development. This non-trivial development has resulted in the graphical user interfaces described herein which may provide significant cognitive and ergonomic efficiencies and advantages over previous systems. The interactive and dynamic graphical user interfaces include improved human-computer interactions that may provide reduced mental workloads, improved decision-making, improved capabilities, reduced work stress, and/or the like, for a user. For example, user interaction with the interactive graphical user interface via the inputs described herein may provide an optimized display of, and interaction with, machine vision devices, and may enable a user to more quickly and accurately access, navigate, assess, and digest analyses, configurations, image data, and/or the like, than previous systems.

Various embodiments of the present disclosure provide improvements to various technologies and technological fields, and practical applications of various technological features and advancements. Additionally, various embodiments of the present disclosure are inextricably tied to, and provide practical applications of, computer technology. In particular, various embodiments rely on detection of user inputs via graphical user interfaces, operation and configuration of algorithmic models, calculation of updates to displayed electronic data based on user inputs, automatic processing of image data, and presentation of updates to displayed images and analyses via interactive graphical user interfaces. Such features and others are intimately tied to, and enabled by, computer and machine vision technology, and would not exist except for computer and machine vision technology.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 4A, 4B, and 4C are example user interfaces that may be displayed to a remote computing device, such as the user of the event analysis system, the safety admin system, and/or other devices.

DETAILED DESCRIPTION

Figure 1A:
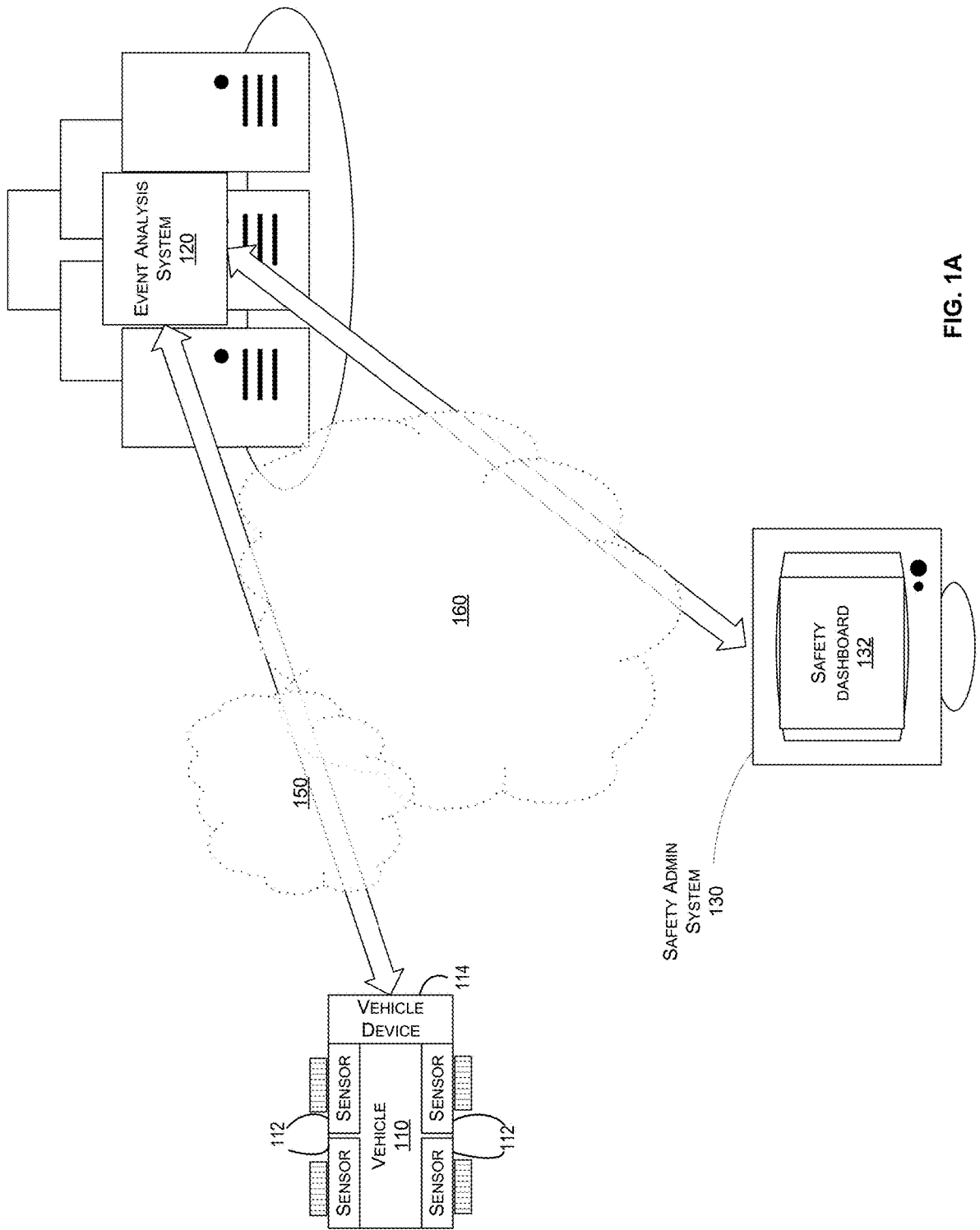
FIG. 1A illustrates an event analysis system in communication with a vehicle device and a safety admin system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Vehicle Device: an electronic device that includes one or more sensors positioned on or in a vehicle. A vehicle device may include sensors such as one or more video sensors, audio sensors, accelerometers, global positioning systems (GPS), and the like. Vehicle devices include communication circuitry configured to transmit data to a backend (or "cloud" server), for example.

Sensor Data: any data obtained by a vehicle device, such as video files, still images, audio data, accelerometer data, global positioning system (GPS) data, ECU data, vehicle speed data, forward camera object tracking data, driver facing camera data, hand tracking data and/or any other related data and/or other data files. Sensor data may include, for example:

Video files, which may be uploaded for each camera of a multi-camera vehicle device. Video files that are uploaded to the event analysis system may be trimmed to a default length by the vehicle device (e.g., 3 seconds before and 3 seconds after the detected safety event) and/or may be selected based on rules associated with the detected event. Video transcode may be customized to adjust the bit rate, frame rate, resolution, etc. of video files.

Still Images from each camera, e.g., single frames of a video file, may be transmitted to the event analysis system either as part of initial event data transmitted to the event analysis system after detecting a safety event and/or in response to a request for still images from the event analysis system. In situations where the event analysis system requests still images from a vehicle device, the event analysis system may determine image settings (e.g., image quality, downsampling rate, file size, etc.), as well as timeframe from which images are requested (e.g., one image every 0.2 seconds for the five second time period preceding the detected event).

Audio data can be combined with video, or sent separately and transcoded into video files after the fact. The event analysis system may determine audio transcoding parameters for requested audio data.

Metadata: data that provides information regarding a detected event, typically in a more condensed manner than the related asset data. Metadata may include, for example, accelerometer data, global positioning system (GPS) data, ECU data, vehicle speed data, forward camera object tracking data, inward (driver)-facing camera data, hand tracking data and/or any other related data. For example, metadata regarding a triggered event may include a location of an object that triggered the event, such as a vehicle in which a forward collision warning ("FCW") or tailgating safety event has triggered, or position of a driver's head ("head pose") when a distracted driver event has triggered. Metadata may include calculated data associated with a detected safety event, such as severity of the event, which may be based on one or more event models that may consider duration of an event, distance to a leading vehicle, and/or other event data. Metadata may include information about other vehicles within the scene in the case of tailgating or FCW event, as well as confidence levels for these detections. Metadata may also include information such as event keys and other identification information, event type, event date and time stamps, event location, and the like.

High-resolution video: video files that are renderable to depict significant detail. For example, high-resolution video may be 4K Ultra HD video recorded at 60 fps or more. The term high-resolution video does not signify any particular resolution or frame rate, but more generally indicates a video file that holds more image detail than a corresponding low-resolution video.

Low-resolution video: video files that are renderable to depict less detail than a corresponding high-resolution video file. For example, low-resolution video may be 1080p at 30 fps or less. The term low-resolution video does not signify any particular resolution or frame rate, but more generally indicates a video file that holds less image detail than a corresponding high-resolution video.

Combined Media File: a file typically generated by a vehicle device to include time-synced high-resolution video, low-resolution video, and/or metadata for a particular time period. For example, the vehicle device may generate a combined media file associated for a safety event that includes, for a particular time period (e.g., 30 seconds) surrounding the safety event, high-resolution video, low-resolution video, audio (e.g., recorded by a microphone in the vehicle device), and metadata such as accelerometer data. This combined media file may be transmitted automatically to a requested device (e.g., to cloud storage accessible by the requested device) upon triggering of the safety event and/or may be transmitted in response to a request for video data (e.g., by a safety officer). The vehicle device may be configured to modify existing combined media files, such as by accessing a combined media file for a particular time period, removing all data except the low-resolution video, and re-storing the combined media file. For example, when video storage space on a vehicle device is low, the device may be configured to strip high-resolution video and metadata from the oldest video data stored on the device.

Event Data: data associated with an event, such as a set of sensor data (e.g., metadata and/or asset data), such as photographs, video files, etc., associated with a detected safety event.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example System Overview

FIG. 1A illustrates an event analysis system 120 in communication with a vehicle device 114 and a safety admin system 130. In this embodiment, the vehicle 110 includes a vehicle device 114, which may physically incorporate and/or be coupled to (e.g., via wired or wireless communication channel) a plurality of sensors 112. In some embodiments, the vehicle device 114 comprises a dash cam, such as the example dash cam illustrated in FIGS. 1B-1D. In other embodiments, the vehicle device 114 may include other components.

The sensors 112 may include, for example, one or more inward-facing camera and one or more outward-facing camera. The vehicle device 114 further includes one or more microprocessors and communication circuitry configured to transmit data to the event analysis system 120, such as via one or more of the networks 150, 160. In this example, a safety dashboard 132 may be generated on a safety admin system 130 to illustrate event data from the event analysis system 120, such as via an online portal, e.g., a website or standalone application. The safety admin system 130 may be operated, for example, by a safety manager that reviews information regarding triggered safety events associated with a fleet of drivers/vehicles.

Various example computing devices 114, 120, and 130 are shown in FIG. 1A. In general, the computing devices can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment (e.g., the safety admin system 130, the event analysis system 120, etc.) via various computing devices. Such interactions may typically be accomplished via interactive graphical user interfaces or voice commands, however alternatively such interactions may be accomplished via command line, and/or other means.

As shown in the example of FIG. 1A, communications between the vehicle device 114 and event analysis system 120 primarily occurs via network 150, while communication between the event analysis system 120 and safety admin system 130 typically occurs via network 160. However, networks 150, 160 may include some or all of the same communication protocols, services, hardware, etc. Thus, although the discussion herein may describe communication between the vehicle device 114 and the event analysis system 120 via the network 150 (e.g., via cellular data) and communication between the event analysis system 120 and the safety admin system 130 via a wired and/or a wireless high-speed data communication network, communications of the devices are not limited in this manner.

In some embodiments, the vehicle device transmits encrypted data via SSL (e.g., 256-bit, military-grade encryption) to the event analysis system 120 via high-speed 4G LTE or other wireless communication technology, such as 5G communications. The network 150 may include one or more wireless networks, such as a Global System for Mobile Communications (GSM) network, a Code Division Multiple Access (CDMA) network, a Long Term Evolution (LTE) network, or any other type of wireless network. The network 150 can use protocols and components for communicating via the Internet or any of the other aforementioned types of networks. For example, the protocols used by the network 150 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The network 160 may similarly include any wired network, wireless network, or combination thereof. For example, the network 160 may comprise one or more local area networks, wide area network, wireless local area network, wireless wide area network, the Internet, or any combination thereof.

Figure 1B:
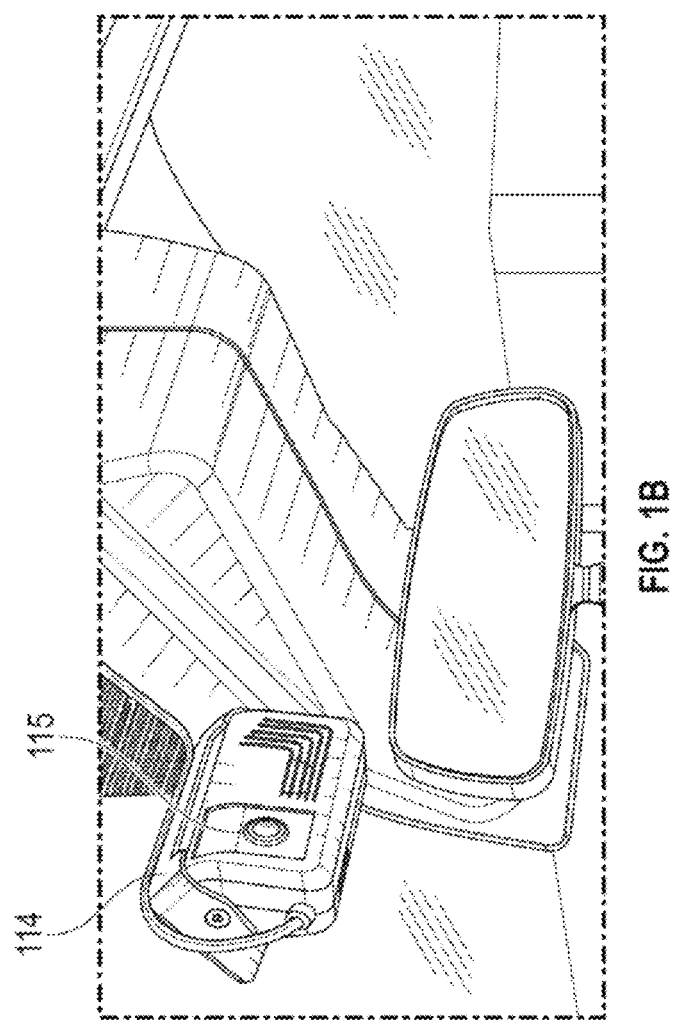
FIG. 1B illustrates an example vehicle device with an inward-facing camera mounted inside a vehicle.
Figure 1C:
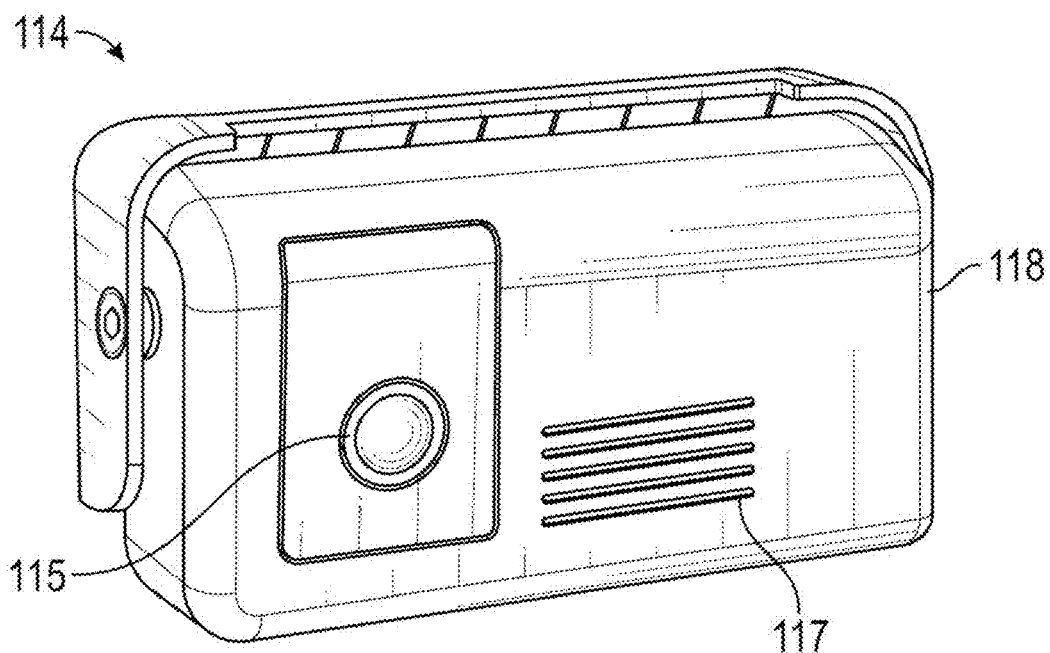
FIG. 1C is a front view of the vehicle device showing the inward-facing camera.
Figure 1D:
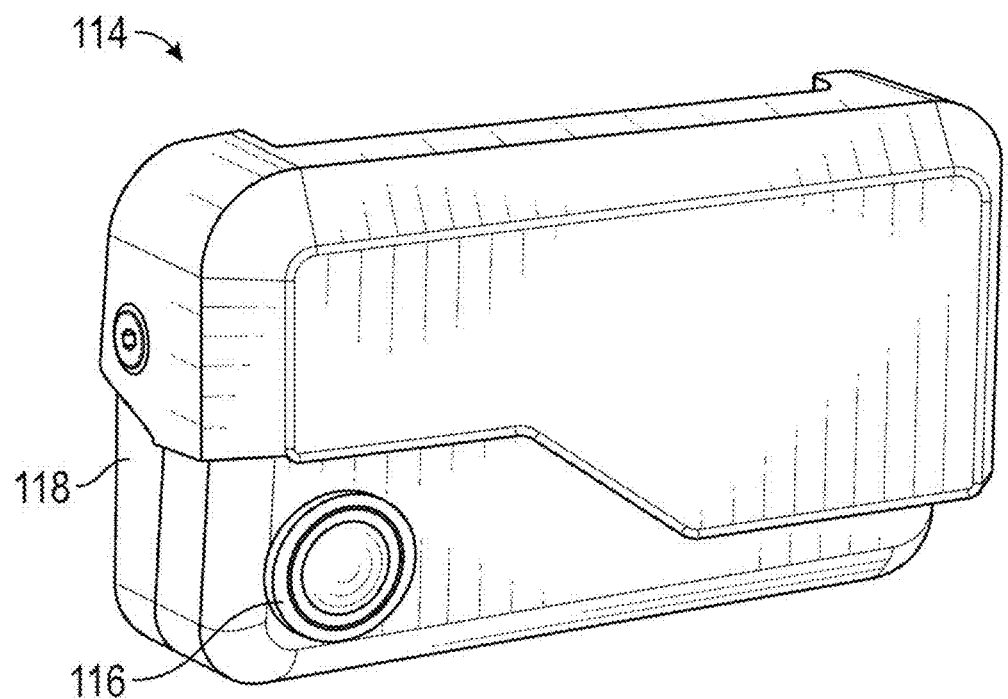
FIG. 1D is a rear view of the vehicle device showing an outward-facing camera (e.g., positioned to obtain images forward of the vehicle).

FIG. 1B illustrates an example vehicle device 114 with an inward-facing camera 115 mounted inside a vehicle. FIG. 1C is a front view of the vehicle device 114 showing the inward-facing camera 115, and FIG. 1D is a rear view of the vehicle device 114 showing an outward-facing camera 116 (e.g., positioned to obtain images forward of the vehicle). In this example, the vehicle device 114 includes an access panel 117 configured to allow alert signals from a speaker within the enclosure 118 of the vehicle device 114 to be better heard within the vehicle. In some embodiments, a microphone is positioned behind the access panel 117 also, or behind a similar additional access panel. In other embodiments, the vehicle device may include different quantities of video and/or still image cameras. For example, as discussed in further detail below, in some embodiments the vehicle device is configured to store multiple streams of video data from the outward facing camera 116, such as a high-resolution and low-resolution video stream. In such an embodiment, the vehicle device may be configured to automatically remove older portions of the high-resolution video stream while maintaining and storage low-resolution video for an extended time period. The video files and/or related metadata may be stored in a combined media file in some embodiments. For example, the vehicle device may be configured to generate and store the newest (e.g., current) high-resolution video, low-resolution video, audio, and accelerometer data in a combined media file. The combined media file may later be accessed by the vehicle device or a remote device to access the various files within the combined media file, such as to play back the high-resolution video with audio. The combined data file may and/or to modify contents of the combined media file, such as to remove high-resolution video for a particular time period from the combined media file.

The dual-facing cameras (e.g., the inward-facing camera 115 and one or more outward-facing cameras 116) may be configured to automatically upload and/or analyze footage using event detection models configured to detect (or "trigger") safety events. For example, as discussed further herein, the vehicle device 114 may advantageously apply event detection models to sensor data, including video data from one or more of the cameras, to detect safety events in real time as the events are happening. While the specifications of vehicle devices may vary greatly from one implementation to another, in one example embodiment a vehicle device may include some or all of the components below:

- Outward-facing camera with a field of view of 121° or more, resolution of at least 1080p (Full HD) video, frame rate of at least 30 frames per second, HDR to optimize for bright and low-light conditions.
- Inward-facing camera with a field of view of 177° or more to identify unsafe in-cab behaviors, resolution of at least 720p (HD) video, frame rate of at least 30 frames per second, infrared LED for unlit nighttime in-cab video.
- Audio input and/or output device(s) configured to provide voice coaching, such as voice-based feedback and alerts in response to detection of safety events, as well as the ability to turn on audio capture (e.g., via one or more microphones) for extra context during disputes and incidents.
- Recording capabilities and storage to record video footage for a rolling time period. Depending on the allocation of disk space for high-resolution versus lower resolution video storage, the device may store different amounts of high-resolution and low-resolution video, such as in a combined media file. Depending on the video settings, such as frame rate and resolution of each of the high and low-resolution video streams, high-resolution video may require 10, 20, or more times more spaces than corresponding low-resolution video. As an example, a user may opt to store primarily high-resolution video, causing storage of about 60 hours of high-resolution and 50 hours of low-resolution video on a particular vehicle device, while if the user opts to store primarily low-resolution video, the system may store about 10 hours of high-resolution video and 300 hours of low-resolution video on that same vehicle device. These numbers vary based on many factors, such as maximum storage capacity, the particular encoding of the high-resolution and low-resolution video streams, etc. In some embodiments, the device may store 60-400 hours or more of driving time video (e.g., in some combination of low-resolution and high-resolution video streams) on the vehicle device, with an option for retrieval by the event analysis system, such as to provide additional context associated with a detected safety event in a safety dashboard. A combined media file including video data, audio data, and/or metadata, may be automatically uploaded to an event analysis system (e.g., in the cloud) for further analysis, such as automatically uploading five seconds before to five seconds after each safety event is detected. In some embodiments, if high-resolution video is available for the time period associated with the safety event, the high-resolution video is automatically uploaded.
- Still images may also be captured and stored locally and/or transmitted to the event analysis system, such as in a combined media file and/or separate image files. A panic button may be provided to allow the driver to manually trigger a safety event and upload video footage from one or more of the cameras. For example, the panic button may be a physical button on the vehicle device enclosure 118 and/or a virtual (or software) button that may be activated by a voice command from the driver (or a passenger in the vehicle).
- Data transfer circuitry configured to automatically upload event data (e.g., metadata and asset data) to the event analysis system, where the event data may be further analyzed. In some implementations, the data transfer circuitry is configured to detect availability of cellular connectivity and, when connectivity is below a threshold, delay transmission of until cellular connectivity improves.
- Mounting hardware for easily mounting on the inside of a windshield, such as with heavy duty acrylic foam tape, suction cup, velcro, or the like. Tilt control to allow for proper inward-facing orientation with a wide variety of windshields.
- One or more accelerometers, such as accelerometers that measure acceleration (and/or related G forces) in each of multiple axes, such as in an X, Y, and Z axis.
- One or more computer processors, such as high-capacity processors that enable concurrent neural networks for real-time artificial intelligence.

The various example computing devices 110, 120, 130, and others, can be any computing device such as a server, server farm, virtual computing device, desktop, laptop or tablet computer, personal computer, tablet computer, wearable computer, server, personal digital assistant (PDA), hybrid PDA/mobile phone, mobile phone, smartphone, set top box, voice command device, digital media player, and the like. A computing device may execute an application (e.g., a browser, a stand-alone application, etc.) that allows a user to access interactive user interfaces, view images, analyses, or aggregated data, and/or the like as described herein. In various embodiments, users may interact with various components of the example operating environment via various computing devices. Such interactions may be accomplished via interactive graphical user interfaces, however alternatively such interactions may be accomplished via command line, and/or other means.

Example Video Data Storage and Access

Figure 2:
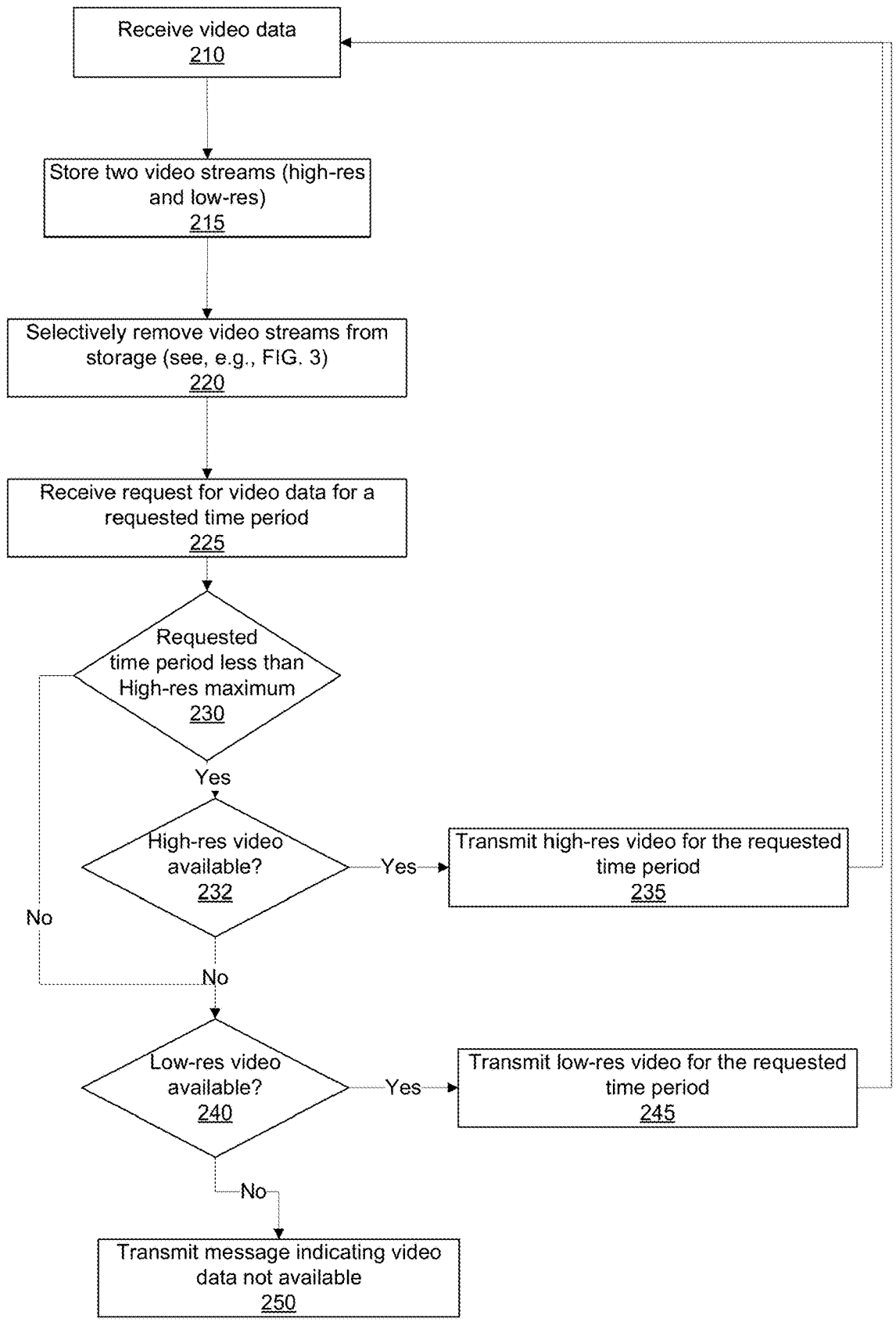
FIG. 2 is a flowchart illustrating one example of an embodiment of a method for storing and retrieving video data, such as video streams from an outward facing camera of a dash cam.

FIG. 2 is a flowchart illustrating one example of an embodiment of a method for storing and retrieving video data, such as video streams from an outward facing camera of a dash cam. While the discussion herein is with reference to a dash cam associated with a vehicle, the systems and methods described herein are equally applicable to any other device, such as any other Internet of things IoT devices, such as recording devices that may be placed in homes, offices, outdoors, etc. Depending on the embodiment, the method of FIG. 2 may include fewer or additional blocks and/or the blocks may be performed in an order different than is illustrated.

Beginning at block 210, video data is received. In the example of a dash cam, video data from an outward facing camera for one or more data streams may be received. For example, in some implementations the dash cam includes a video encoding chipset configured to provide multiple data streams, such as a high-quality video data stream and a corresponding low-quality video data stream. The parameters of each of the high-quality and low-quality video data streams may be user configurable, such as to allow the user to adjust frame size, bit rate, resolution, and/or any other parameters of the video data streams. In some embodiments, a combined media file including the high-resolution video stream, the low-resolution video stream, audio data, and/or metadata, may be generated and stored by the vehicle device. In other embodiments, the media data (e.g., the high-resolution video stream, the low-resolution video stream, audio data, and/or metadata) are stored as separate discrete files on the vehicle device.

In some embodiments, low-resolution video and high-resolution video are stored as separate files (e.g., not in a combined media file), possibly in separate directories on the storage device for easier access. In some embodiments, only a high-resolution video may be stored on the vehicle device as the high-resolution video stream is received from the camera, and low-resolution video of the oldest high-resolution video may be generated when the video storage space reaches a free space threshold. Thus, in such an embodiment the vehicle device would store only one version of a video file at any point in time, with older high-resolution video files being converted to low-resolution video files to make space for newer high-resolution video files.

Next, at block 215, the high-quality and the low-quality video streams are stored on the device. As noted above, the storage space available for video data on the vehicle device is limited.

Figure 3:
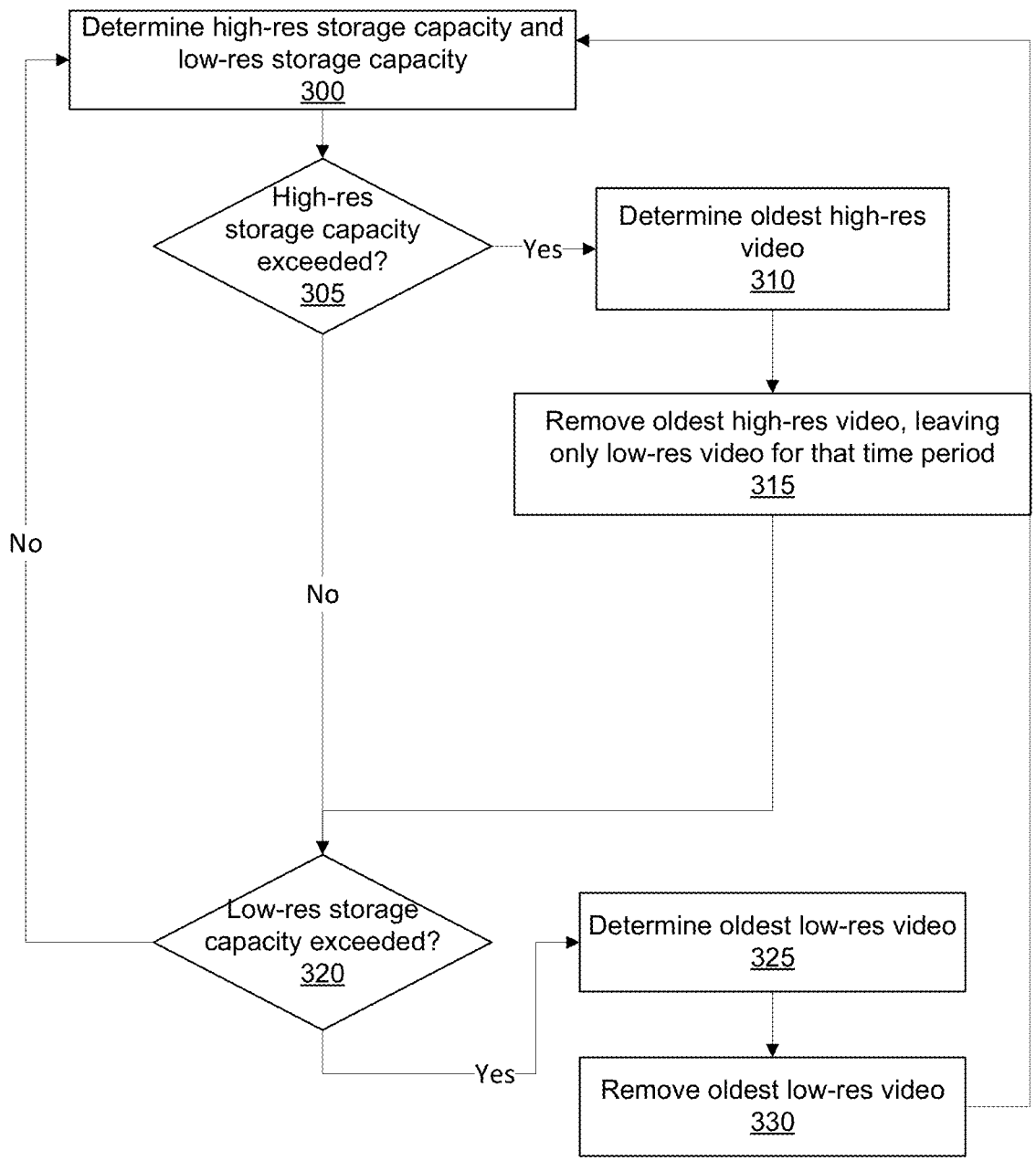
FIG. 3 is a flowchart illustrating one example embodiment of a method of removing video data from a data storage device, such as from a volatile or non-volatile storage device on a dash cam or other IoT device.

At block 220, the device is configured to periodically determine if video streams stored on the device should be removed to make space for new video streams. For example, as the storage space on the dash cam is reduced to below a threshold level (e.g., below 10% of remaining storage space available), the oldest high-resolution video streams may be removed (e.g., deleted or marked for overwriting). In embodiments where a combined media file is used, the oldest high-resolution video streams (and/or the audio and metadata) may be stripped from the combined media file, leaving the low-resolution video stream in the combined media file. Advantageously, removal of high-resolution video fora particular time period (e.g., the oldest high-resolution video stored on a device) does not necessarily remove the low-resolution video data for that particular time period (e.g., a separate low-resolution video file or a low-resolution video portion of a combined media file that also includes the high-resolution video). Thus, the dual video stream embodiments discussed herein advantageously allow recording of a longer duration of video data, including newer video data in both a high quality and a low-quality format and older video data in only a lower quality format. FIG. 3 provides one example process of how video data may be selectively removed from the device storage.

Moving to block 225, the dash cam receives a request for video data for a requested time period, such as from the event analysis system 120 and/or another network connected device. For example, a safety officer may request video data for a requested time period associated with a safety event.

At block 230, the device determines whether the requested time period is less than a maximum time period for which high-resolution video is uploaded. In view of the potential bandwidth constraints and potential additional cost of transmitting high-resolution video (as compared to low-resolution video), in some embodiments a high-resolution maximum time period may be established by an administrator or safety officer. For example, the high-resolution maximum may be set to one minute, such that if a request for video data is longer than one minute, the dash cam will default to providing only low-resolution video for that requested time period. Thus, if the requested time period is less than the high-resolution maximum at block 230, the method continues to block 232 where the device determines whether high-resolution video is available for the requested time period. If high-resolution video is available, the method continues to block 235 where the high-resolution video for the requested time period is transmitted, such as to the requesting device and/or to cloud storage that is accessible by the requesting device. In embodiments where both low-resolution and high-resolution video files are stored in a combined media file, the high-resolution video may be extracted from the combined media file for transmission. On the other hand, if high-resolution video is not available at block 232, or if the requested time period is more than the high-resolution maximum (block 230), the method continues to block 240, where the device determines if low-resolution video is available for the requested time period.

If at block 240, the device determines that low-resolution video is available, the method continues to block 245 where the device transmits low-resolution video for the requested time period to the requesting device and/or to a cloud storage that is accessible by the requesting device. If, however, low-resolution video is not available for the requested time period, the method continues to block 250, where a message may be transmitted to the requesting device indicating that no video data is available for the requested time period.

FIG. 3 is a flowchart illustrating one example embodiment of a method of removing video data from a data storage device, such as from a volatile or non-volatile storage device on a dash cam or other IoT device. Depending on the embodiment, the method of FIG. 3 may include fewer or additional blocks and/or the blocks may be performed in an order different than is illustrated.

In some embodiments, a video removal process, such as in the example of FIG. 3, may be initiated by a determination that a free space allocation of the device has been exceeded. For example, if a free space allocation is set to 10%, the process of FIG. 3 to remove older video data may be initiated once the free space of the device reaches 10% or less, regardless of whether the high resolution or low resolution allocations have been exceeded. Thus, a completely empty storage device that starts recording both high and low resolution video will have high resolution video available for all of the recorded time (regardless of configured high vs low resolution balance settings) at least until the free space allocation (e.g., 10%, 5%, 0%, or some other user configured level) is reached, at which point the balance of high to low resolution video stored on the device will gradually shift until it is within the allocation limits, such as via the process of FIG. 3.

Beginning at block 300, the device determines storage space allocations on the device storage medium for each of high-resolution and low-resolution video streams. In some embodiments, the allocation is determined based on a default allocation of a total storage device capacity. For example, a default allocation may be for 60% high-resolution, 30% low-resolution, and 10% free space. In some embodiments, allocations of available video storage may be selectable by a user, such as by a system administrator or safety officer, such as is discussed with reference to FIGS. 4-6.

At block 305, the device determines whether the high-resolution storage capacity has been exceeded, or is close to being exceeded in some implementations. For example, if the high-resolution storage allocation is 60% of the total available video stream storage capacity on a particular device, and the currently stored high-resolution video is more than 60% of that total available video stream storage capacity, the method continues to block 310.

At block 310, the device determines the oldest high-resolution video stored on the device. For example, the high-resolution video with the oldest timestamps (e.g., furthest in time away from the current time) may be selected as the oldest high-resolution video. Depending on the embodiment, the determined high-resolution video may include one or more discrete video streams (e.g., associated with one or more separate trips that triggered recording of high-resolution video by the dash cam) and/or video data for a set time period may be selected for removal, such as the last 30 minutes, hour, two hours, or other predetermined time period, of high-resolution video, in one or more separate video files. Depending on the embodiment, the high-resolution video may be part of a combined media file and/or a separate high-resolution video file.

Moving to block 315, the determined oldest high-resolution video is removed from the device, such as by deleting the high-resolution video or updating the storage device indexing information to indicate that locations where the oldest high-resolution video is stored may be overwritten with new data. In some embodiments, removal of the high-resolution video does not impact the corresponding low-resolution video associated with that same determined time period. Thus, even while the oldest high-resolution video is being periodically removed from the storage device, low-resolution video may remain for many hours, days, or weeks of footage prior to the oldest high-resolution video, and may remain accessible to requesting devices. In situations where a combined media file is used, the oldest high-resolution video may be removed from the combined media file, leaving the low-resolution video file in the combined media file. As used herein, high-resolution video may include only the high-resolution video data or may include the high-resolution video data, audio data, and/or metadata. Thus, references herein to access, removal, deletion, etc. of high-resolution video data or files may refer to only the high-resolution video data or to the high-resolution video data, audio data, and/or metadata.

After removal of high-resolution video at block 315, or if high-resolution storage allocation was not exceeded at block 305, the method continues to block 320 where the device determines if a low-resolution storage allocation has been exceeded. For example, if the high-resolution video stream allocation is 30% of available video storage space, and the currently stored low-resolution video is more than 30% of the available video storage space, the method continues to block 325. At block 325, the device determines the oldest low-resolution video stored on the device. For example, the low-resolution video with the oldest timestamps (e.g., furthest away in time from the current time) may be selected as the oldest low-resolution video.

At block 330, the determined low-resolution video may then be deleted from the device, leaving newer low-resolution video and high-resolution video on the device and accessible to requesting remote devices.

In some embodiments, certain video clips (e.g., either high-resolution or low-resolution) may be marked as priority video clips indicating that they should not be removed from the storage device even if the video clips are the oldest and otherwise would be deleted to make space for newer video. In other embodiments, other methods for removing portions of high-resolution and/or low-resolution video may be implemented, while still realizing certain benefits of a dual stream video recording device.

Example User Interfaces

FIG. 4 (including FIGS. 4A, 4B, and 4C) are example user interfaces that may be displayed to a remote computing device, such as the user of the event analysis system 120, the safety admin system 130, and/or other devices. The user interfaces of FIG. 4 are only an example of interactive functionality that may be provided to an end user. In other embodiments, other user interface designs and functionality may be used to allow a user to select preferred low-resolution and high-resolution video recording parameters.

Beginning with FIG. 4A, the user is provided with an indication 410 that the slider 420 may be adjusted to dynamically adjust the quantity of high-resolution and low-resolution video storage on a particular dash cam (or other IoT device, for example). In this example, the slider 420 is movable towards a left end 422 where more device storage is allocated for high-resolution video (and less low-resolution video) or towards the right end 424 where more device storage is allocated for low-resolution video (and less high-resolution video), and correspondingly, is available for retrieval by external devices. With the slider 420 positioned as shown in FIG. 4A, in this example the dynamic storage indicator 430 shows that the dash cam will be able to store approximately 226 hours of low-resolution video and 16 hours of high-resolution video. Moving to FIG. 4B, the slider 420 has been moved towards the right end 424, indicating that the user wishes to allocate more storage space for low-resolution video and less for high-resolution video. With the slider as positioned in FIG. 4B, the storage indicator 430 is updated to show that approximately 380 hours of low-resolution video and 1.5 hours of high-resolution video will be stored on the device. As another example, with the slider 420 positioned as shown in FIG. 4C, closer to the left end 422, the storage indicator 430 shows that the dash cam will be able to store approximately 60 hours of low-resolution video and 34 hours of high-resolution video. In this example, the ratio of storage space required for high-resolution video to low-resolution video is about 10:1. Thus, the storage space required for about an hour of high-resolution video is roughly the same as about 10 hours of low-resolution video. As noted elsewhere, the relative space requirements of high and low-resolution may vary significantly from one implementation to another based on several factors, primarily resolution and frame rate of the high and low-resolution video streams.

In some embodiments, the user may select any allocation of low-resolution to high-resolution video with user interface functionality such as is illustrated in FIG. 4, even to the point of indicating that no high-resolution video (or no low-resolution video) should be stored. In some embodiments, a minimum quantity of high-resolution video to be stored is predetermined, such as based on factory defaults of the device and/or administrator settings. In such an embodiment, the user interface would not allow the user to reduce the quantity of high-resolution video below the minimum quantity. In some embodiments, a similar minimum quantity may be established for low-resolution video.

Figure 5:
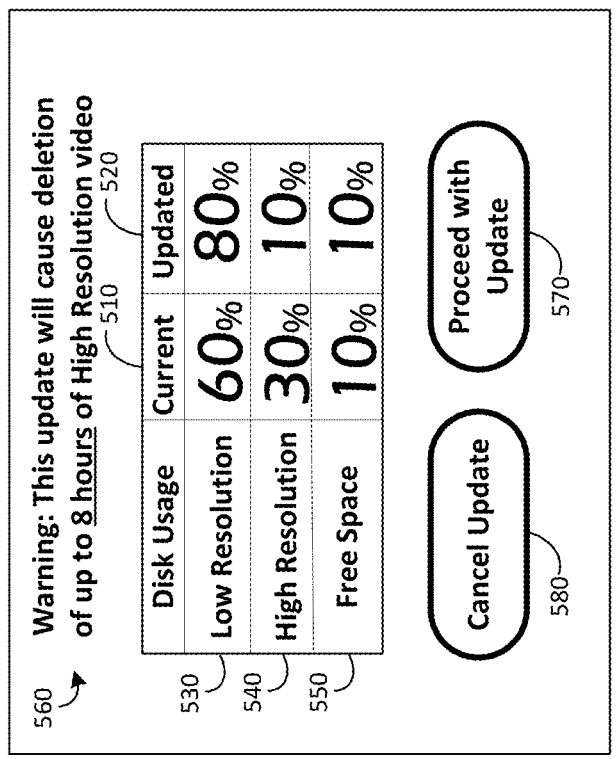
FIG. 5 is an example user interface that provides additional information regarding current usage of video storage space and an updated allocation of the video storage space.

FIG. 5 is an example user interface that provides additional information regarding current usage of video storage space and an updated allocation of the video storage space. The interface of FIG. 5 may be presented to the user after the slider of FIG. 4 has been moved, such as in a pop-up or another portion of the user interface of FIG. 4. In the example of FIG. 5, a current disk usage 510 indicates the current allocations of the available storage for high-resolution video 530 and for low-resolution video 540, and an amount that remains allocated as free space 550. Hence, in the example shown in FIG. 5, 60% of the video storage space is allocated for high-resolution video, 30% of the video storage space is allowed for low-resolution video, and 10% is allocated as free space. Updated usage 520 indicates an updated allocation of video storage space that the user has provided, such as with the user interface similar to those in FIG. 4. In this example, the updated usage 520 indicates an allocation of 80% for high-resolution video, 10% for low-resolution video, with 10% remaining free space. In this example, the amount of drive space allocated for high-resolution video is being reduced (e.g., from 30% to 10%), which will result in deletion of some of the high-resolution video currently stored on the device. Thus, in this example, a warning 560 is provided to the user that if they proceed with the proposed updated video storage allocations 520, up to 8 hours of high-resolution video will be deleted from the device. In this example, the user can instruct the device to proceed with the update, and thus deleting up to 8 hours of high-resolution video, by selecting the update button 570. In some embodiments, when the storage balance changes, video data may not be immediately deleted from the device, but may be gradually deleted to match the new storage balance settings as the camera continues to record. In such an embodiment, the high-resolution video is not immediately deleted from the storage device, but instead becomes available for deletion as the proportion of new low-resolution video stored on the storage device increases upward to 80% over time. If the user does not wish to proceed with the updated allocation, a cancel button 580 may be selected, which may return the user to a video storage allocation interface, such as those discussed with reference to FIG. 4.

Figure 6:
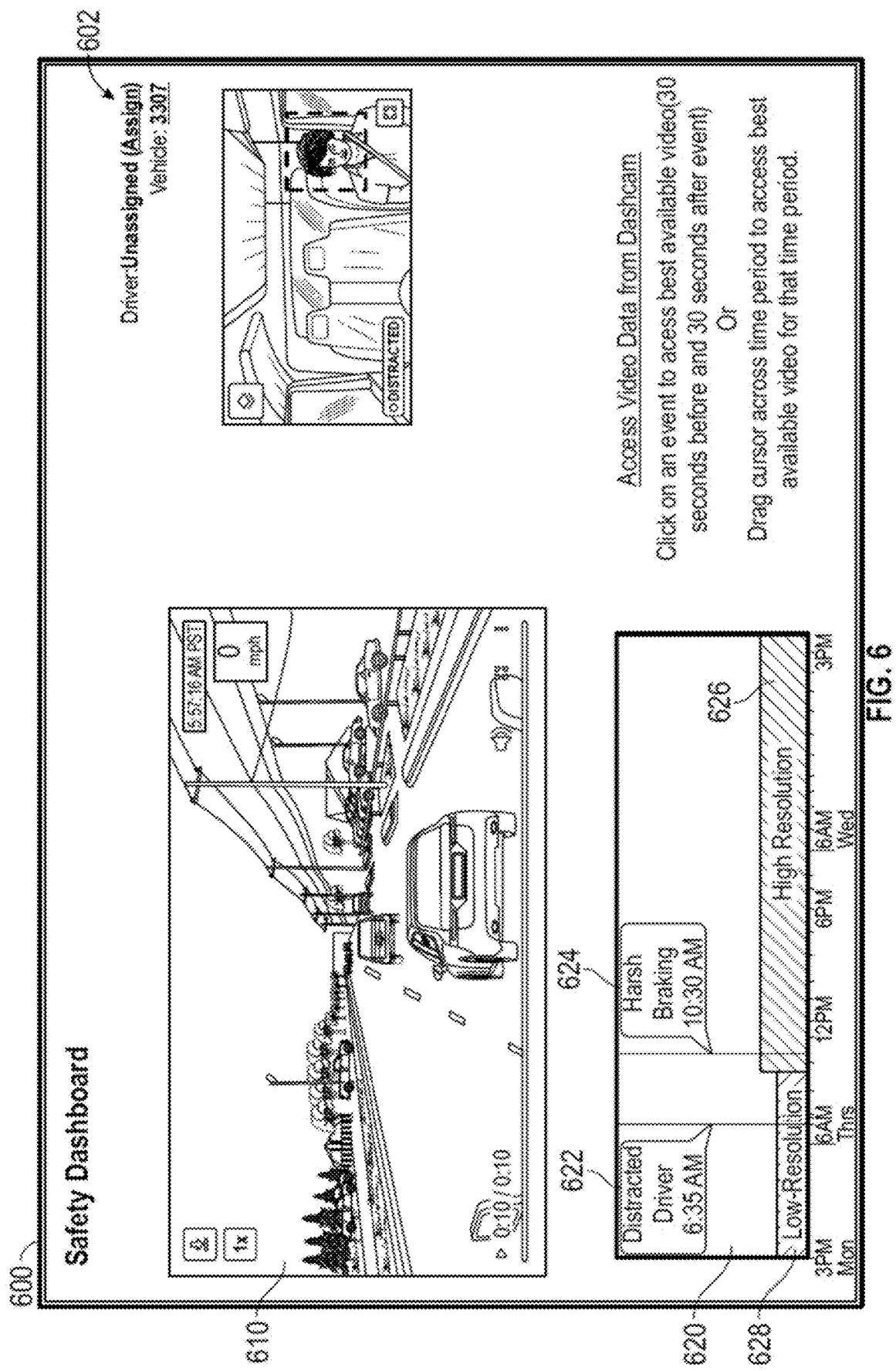
FIG. 6 is an example user interface that may be viewed by a remote user, such as by a safety officer on the safety admin system of FIG. 1A.

FIG. 6 is an example user interface that may be viewed by a remote user, such as by a safety officer on the safety admin system 130 (FIG. 1A). In this example user interface 600, sensor data associated with a particular driver and/or vehicle 602 is displayed. The example user interface 600 includes a video window 610 that may display the most recent video data from the vehicle's dash cam, such as high-resolution video that has been automatically uploaded to cloud storage accessible by the admin system 130. Alternatively, the video window 610 may show a live stream of video from the dash cam's outward facing and/or inward facing cameras, such as at a lower resolution.

An event timeline 620 includes indications of past safety events and/or other events of interest associated with the vehicle and/or the driver. Examples of safety events are discussed in further detail in U.S. patent application No. 63/113,645, filed on Nov. 13, 2020, and titled "DYNAMIC DELIVERY OF VEHICLE EVENT DATA," the contents of which is hereby incorporated by reference in its entirety and for all purposes. In the particular example of FIG. 6, the event timeline 620 includes two safety events, a distracted driver event 622 and a harsh braking event 624. The example event timeline 620 also includes an indication of the best video quality that is available for each time period. For example, during the time period associated with high-resolution indicator 626, a high-resolution video stream is available for retrieval and viewing. As noted above, certain vehicle devices are configured to store both high-resolution and low-resolution video streams or at least the most recent video data obtained by the device. Thus, an indication of the availability of high-resolution video does not necessarily indicate that the high-resolution video is the only stream available, as in some situations a low-resolution video may also be available from that time. The low-resolution indicator 628 shows a time period for which only low-resolution video is available. For example, high-resolution and low-resolution video may have originally been stored for that time period, but as the available storage space on the device decreased to below a certain threshold, older portions of the high-resolution video stream may have been removed from the storage device.

In some embodiments, the user may select one of the indicated harsh event indicators 622, 624, such as by clicking on the event indicators, to initiate automatic upload of the best available video stream associated with the event, such as ten seconds (or other time period) before and after the event. For example, the user may select the harsh braking event 624 to initiate a request to the dash cam for the best available video (high-resolution video in this example) associated with that harsh braking event. Similarly, the user may select the distracted driver event 622 to initiate a request to the dash cam for the best available video (low-resolution video in this example) associated with that distracted driver event.

In some embodiments, the user can select a quality of video stream to retrieve from the dash cam in other manners. For example, while high-resolution video is available for the harsh braking event 624, the user may be able to select low-resolution video for retrieval, such as if the user believes that high-resolution video associated with the harsh braking event is not necessary. In some embodiments, the user is able to indicate a requested time period for video data that is customized. In the example of FIG. 6, the user interface is configured to detect horizontal dragging of a cursor (or stylus, finger, or other input device) across a portion of the event timeline 620 to indicate a requested time period of video data. For example, the user could click on an area of the event timeline 622 to the right of the harsh braking event indicator 624 and drag the cursor to an area of the event timeline to the left of the harsh braking event indicator 624 to define a custom requested time period. In some embodiments, the quantity (either length of time or file size) of high-resolution video data that may be automatically retrieved from the dash cam is limited, such as to one minute of a high-resolution video (or other preset duration or file size). Thus, if a user selects more than one minute of high-resolution video, such as using the event timeline 620, the system may adjust the request that is sent to the dash cam so that only low-resolution video for that selected time period is requested. Alternatively, the system may request high-resolution video for the one minute period surrounding any safety events in the requested time period, and low-resolution video for the remainder of the requested time period.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A dash cam computing system configured for operation within a vehicle, the dash cam computing system comprising:
   one or more imaging devices;
   a hardware computer processor; and
   a non-transitory computer readable medium having software instructions stored thereon, the software instructions executable by the hardware computer processor to cause the computing system to perform operations comprising:
      receiving, from the one or more imaging devices, a high-resolution video stream and a low-resolution video stream from an outward facing camera;
      receiving audio data;
      receiving metadata associated with the vehicle, the metadata including accelerometer data;
      generating a combined media file comprising the high-resolution video stream, the low-resolution video stream, the audio data, and the metadata;
      storing the combined media file on the computer readable medium, wherein the computer readable medium has a maximum video file allocation; and
      in response to exceeding the maximum video file allocation with the high-resolution video stream, the low-resolution video stream, the audio data, and the metadata stored on the computer readable medium:
         determining a portion of the combined media file associated with an oldest timestamp of high-resolution video, the determined portion spanning a time period; and
         removing, from the combined media file, at least the high-resolution video stream for the time period to increase available storage space on the computer readable medium.

2. The computing system of claim 1, further comprising; determining a high-resolution storage allocation for high-resolution video and a low-resolution storage allocation for low-resolution video, wherein the high-resolution storage allocation plus the low-resolution storage allocation are less than the maximum video file allocation;
   in response to the exceeding the maximum video file allocation, determining whether the low-resolution storage allocation for low-resolution video has been exceeded; and
   in response to determining that the low-resolution storage allocation for low-resolution video has been exceeded, determining an oldest portion of the low-resolution video stream and removing the determined oldest portion of the low-resolution video stream from the combined media file.

3. The computing system of claim 2, wherein the maximum video file allocation comprises a free space allocation, the high-resolution storage allocation and the low-resolution storage allocation.

4. The computing system of claim 3, wherein the free space allocation is less than about ten percent of the maximum video file allocation.

5. The computing system of claim 2, further comprising:
   providing an allocation user interface to a remote computing device, the allocation user interface including one or more selectable controls usable to adjust a desired allocation between the high-resolution storage allocation and low-resolution storage allocation;
   updating the high-resolution storage allocation and the low-resolution storage allocation based on user input in the allocation user interface.

6. The computing system of claim 1, further comprising:
   receiving, from a remote computing device, a request for video data of the dash cam for a requested time period; and
   if high-resolution video for the requested time period is stored on the computer readable medium, initiate transmission of the high-resolution video for the requested time period to the remote computing device; or
   if high-resolution video for the requested time period is not stored on the computer readable medium, if low-resolution video for the requested time period is stored on the computer readable medium, initiating transmission of the low-resolution video for the requested time period to the remote computing device.

7. The computing system of claim 1, wherein a ratio of storage space required for the high-resolution video compared to the low-resolution video is at least 10:1.

8. The computing system of claim 1, wherein the portion of the combined media file has the oldest timestamp.

9. The computing system of claim 1, wherein the high-resolution video stream and the low-resolution video stream are received from a graphics processor of the dash cam.

10. A computerized method, performed by a computing system having one or more hardware computer processors and one or more non-transitory computer readable storage device storing software instructions executable by the computing system to perform the computerized method comprising:
  receiving, from an outward facing camera positioned within a vehicle, a high-resolution video stream and a low-resolution video stream from an outward facing camera,
  receiving audio data;
  receiving metadata associated with the vehicle, the metadata including accelerometer data;
  generating a combined media file comprising the high-resolution video stream, the low-resolution video stream, the audio data, and the metadata;
  storing the combined media file on the computer readable storage device, wherein the computer readable medium has a maximum video file allocation; and
  in response to an available storage of the computer readable reaching a minimum threshold:
    determining a portion of the combined media file associated with an oldest timestamp of high-resolution video, the determined portion spanning a time period; and
    removing, from the combined media file, at least the high-resolution video stream for the time period to increase available storage space on the computer readable medium.

11. The computerized method of claim 10, further comprising;
  determining a high-resolution storage allocation for high-resolution video and a low-resolution storage allocation for low-resolution video, wherein the high-resolution storage allocation plus the low-resolution storage allocation are less than the maximum video file allocation;
  in response to exceeding the maximum video file allocation, determining whether the low-resolution storage allocation for low-resolution video has been exceeded; and
  in response to determining that the low-resolution storage allocation for low-resolution video has been exceeded, determining an oldest portion of the low-resolution video stream and removing the determined oldest portion of the low-resolution video stream from the combined media file.

12. The computerized method of claim 11, wherein the maximum video file allocation comprises a free space allocation, the high-resolution storage allocation and the low-resolution storage allocation.

13. The computerized method of claim 12, wherein the free space allocation is less than about ten percent of the maximum video file allocation.

14. The computerized method of claim 11, further comprising:
  providing an allocation user interface to a remote computing device, the allocation user interface including one or more selectable controls usable to adjust a desired allocation between the high-resolution storage allocation and low-resolution storage allocation; and
  updating the high-resolution storage allocation and the low-resolution storage allocation based on user input in the allocation user interface.

15. The computerized method of claim 10, further comprising:
  receiving, from a remote computing device, a request for video data of the for a requested time period; and
  if high-resolution video for the requested time period is stored on the computer readable medium, initiate transmission of the high-resolution video for the requested time period to the remote computing device; or
  if high-resolution video for the requested time period is not stored on the computer readable medium, if low-resolution video for the requested time period is stored on the computer readable medium, initiating transmission of the low-resolution video for the requested time period to the remote computing device.

16. The computerized method of claim 10, wherein a ratio of storage space required for the high-resolution video compared to the low-resolution video is at least 10:1.

17. The computerized method of claim 10, wherein the portion of the combined media file has the oldest timestamp.

18. A non-transitory computer readable medium having software instructions stored thereon, the software instructions executable by a hardware computer processor to cause a computing system to perform operations comprising:
  receiving, from an outward facing camera positioned within a vehicle, a high-resolution video stream and a low-resolution video stream from an outward facing camera;
  receiving audio data;
  receiving metadata associated with the vehicle, the metadata including accelerometer data;
  generating a combined media file comprising the high-resolution video stream, the low-resolution video stream, the audio data, and the metadata;
  storing the combined media file on the computer readable storage device, wherein the computer readable medium has a maximum video file allocation; and
  in response to an available storage of the computer readable reaching a minimum threshold:
    determining a portion of the combined media file associated with an oldest timestamp of high-resolution video, the determined portion spanning a time period; and
    removing, from the combined media file, at least the high-resolution video stream for the time period to increase available storage space on the computer readable medium.

\* \* \* \* \*

UNITED STATES PATENT AND TRADEMARK OFFICE
CERTIFICATE OF CORRECTION

PATENT NO. : 11,356,605 B1
APPLICATION NO. : 17/365300
DATED : June 7, 2022
INVENTOR(S) : Sabrina Shemet Page 1 of 1

It is certified that error appears in the above-identified patent and that said Letters Patent is hereby corrected as shown below:

In the Claims

Column 22, Line 16 (approx.), Claim 15, after "data" delete "of the".

Signed and Sealed this
Thirtieth Day of August, 2022

Katherine Kelly Vidal
*Director of the United States Patent and Trademark Office*